Patented Mar. 19, 1929.

1,705,712

UNITED STATES PATENT OFFICE.

ERNEST R. BRIDGWATER, OF WILMINGTON, DELAWARE, AND AARON S. SLACK, OF BROOKLYN, NEW YORK, ASSIGNORS TO E. I. DU PONT DE NEMOURS & COMPANY, OF WILMINGTON, DELAWARE, A CORPORATION OF DELAWARE.

PROCESS OF AND COMPOUND FOR TREATING RUBBER.

No Drawing.      Application filed July 3, 1926. Serial No. 120,517.

This invention relates to a new class of compounds and the discovery that they are adapted to facilitate the production of vulcanized rubber products of superior quality. The invention also relates to the improved rubber compositions resulting from the employment of the new compounds, which are produced by treating a diaryl diamino methane, or a diaryl diamino alkyl methane with the higher fatty acids.

One object of our invention is to control the tendency of the rubber to "scorch" or prematurely vulcanize during the operations which the rubber must undergo prior to vulcanization. A further object is to improve the tensile strength and other mechanical properties of vulcanized rubber compositions, particularly of vulcanized rubber compositions which contain rubber of low grade or quality.

The accomplishment of these objects has been attempted hitherto. It has long been known that aniline exerts a decided softening effect on unvulcanized rubber compounds and therefore has a tendency to prevent premature vulcanization or scorching. Aniline is also a valuable accelerator of vulcanization and is especially useful in conjunction with other organic accelerators. There is, however, very little aniline used in rubber at the present time because of its volatility at mixing and calendering temperatures and the poisonousness of the oil and of its vapors.

It has also been known for many years that the higher fatty acids, for example, stearic acid, have a beneficial effect on the physical properties of vulcanized rubber compounds, the acid being incorporated with the rubber prior to vulcanization. It was pointed out by C. O. Weber in the India Rubber Journal, volume 25, page 488 (1903) that when small percentages of palm oil are incorporated with rubber before vulcanization, the quality of the product is improved due to the free fatty acids of high molecular weight that are found in the oil. Stearic acid and products which contain free fatty acids of high molecular weight, are objectionable, however, because they retard the vulcanization of rubber, especially in compounds containing such popular organic accelerators as diphenylguanidine. Such acids have, nevertheless, been used because they not only improve the quality of the product, as pointed out above, but they render the unvulcanized rubber more plastic. Also, compounds containing them have less tendency to scorch at the temperatures commonly reached during the mixing and calendering operations.

This being the present state of the art, our invention comprises the discovery of a method of combining aniline or other suitable aromatic amines with the higher fatty acids, such as stearic acid, in such a way that the desirable properties of both aniline and acid are retained in the product and the objectionable properties of both are destroyed. In brief, this method comprises condensing a primary aromatic amine with an aliphatic aldehyde and treating the resulting diamine with a higher fatty acid. The products thus produced are of indefinite composition.

The following example will serve to illustrate a preferred embodiment of the process and product of our invention. It is, of course, not our intention to be limited to the particular conditions or compounds therein disclosed.

*Example.*

186 pounds of aniline is introduced into a vessel equipped with a stirrer and approximately 75 pounds of a 40% solution of formaldehyde in water added to it, while stirring vigorously. A vigorous reaction occurs accompanied by a rise in temperature. Suitable cooling means should be provided to prevent the temperature rising over 80° C. otherwise the product is dark in color. The mixture is maintained with rapid stirring for about one hour at a temperature of about 70° C. to 80° C. The reaction which takes place may be represented by the following equation:

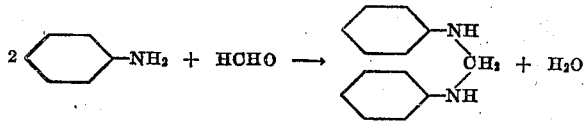

A large part of the water which is produced by the reaction, as well as the water in which the formaldehyde was dissolved, separates from the other product of the reaction which is methylenediphenyl diamine. At this point the water is drawn off by suitable means. The next step in the process is to melt approximately 200 pounds of stearic acid by heating it to a temperature slightly above its melting point, which is 70° C. The molten stearic acid is added to the methylenediphenyl diamine and agitation continued at a temperature from 70° C. to 80° C. for from 15 to 30 minutes. The mixture is then allowed to cool and is ready for incorporation with rubber compounds.

In place of the aniline any primary aromatic amine such as naphthylamine or ortho, meta or para-toluidine may be used. The compound produced from formaldehyde, paratoluidine and stearic acid is notably effective. Any suitable aliphatic aldehyde such as acetaldehyde or butyraldehyde may be substituted for the formaldehyde and any suitable fatty acid of high molecular weight such as oleic acid, linoleic acid or palmitic acid may be substituted for the stearic acid. The proportions mentioned above may also be varied most widely without destroying the efficacy of the product. The products produced in this manner have a mild accelerating effect on vulcanization and are very effective in rendering unvulcanized rubber more plastic. They are incorporated with the rubber stock in the mixers prior to vulcanization.

The following formula illustrates the use in a pneumatic tire tread compound of the product made as hereinbefore described from aniline, formaldehyde and stearic acid:

| Ingredients. | Parts by weight. |
|---|---|
| Smoked sheets | 50 |
| Pale crepe | 50 |
| Carbon black | 34.9 |
| Zinc oxide | 30.25 |
| Diphenylguanidine | 0.75 |
| Sulfur | 3.0 |
| Methylene diphenyl diamine plus stearic acid | 3.0 |

The above compound was vulcanized in a sheet-mold in 45 minutes at 40 pounds of steam pressure. It had a tensile strength of 4,020 pounds and elongation 610%. When the above compound is mixed without adding the methylene diphenyl diamine-stearic acid compound, it requires 60 minutes to vulcanize it at 40 pounds at steam pressure; the tensile strength is 3,540 pounds and the elongation 605%.

The amount of the new product employed with the rubber may be varied from a small fraction of 1% to several per cent, the degree of effect obtained depending upon the percentage used. Larger amounts are particularly advantageous in rubber compounds containing large percentages of carbon black or other finely divided pigments which must be thoroughly dispersed.

The products of our invention are very effective in preventing scorching, or premature vulcanization of rubber compounds. The new products, therefore, have the advantageous properties of aniline without its volatility. The new products, also, have fully as great a beneficial effect upon the physical properties of the rubber as stearic acid itself does. They may be employed with either crude or reclaimed rubber.

We claim:

1. A compound having the properties of the product obtained by condensing two molecular proportions of a primary aromatic amine with one proportion of an aliphatic aldehyde and treating the resulting diamine with a higher fatty acid.

2. A compound comprising the product resulting from treating with a higher fatty acid a compound having the general formula:

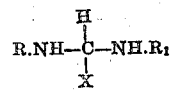

wherein R and $R_1$ represent aromatic groups, and X represents either hydrogen or an alkyl radical.

3. A compound comprising the product resulting from treating with a higher fatty acid a compound having the general formula:

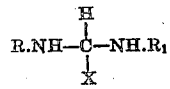

wherein R and $R_1$ represent either a phenyl or tolyl group and X represents either hydrogen or an alkyl group.

4. A compound comprising the product resulting from treating diphenyl-diamino-methane with stearic acid.

5. The process which comprises condensing a primary aromatic amine with an aliphatic aldehyde and treating the resulting diamine with a higher fatty acid.

6. A process which comprises treating with a higher fatty acid a compound having the general formula:

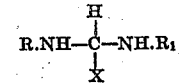

wherein R and $R_1$ represent aromatic groups and X represents either hydrogen or an alkyl radical.

7. A process as set forth in claim 6 wherein R and $R_1$ represents either a phenyl or tolyl group.

8. The process which comprises condensing substantially two molecular proportions of aniline with one proportion of formaldehyde and treating the resulting product with stearic acid.

9. The process of preparing a rubber composition which comprises incorporating with the rubber stock containing a vulcanizing agent, a product of the type set forth in claim 2, and then vulcanizing.

10. The process of preparing a rubber composition which comprises incorporating with the rubber stock containing a vulcanizing agent, a product of the type set forth in claim 3, and then vulcanizing.

11. The process of preparing a rubber composition which comprises incorporating with the rubber stock containing a vulcanizing agent, the product resulting from treating diphenyl-diamino-methane with stearic acid and, thereafter, vulcanizing.

12. A rubber composition resulting from the vulcanization of a rubber mix comprising the product set forth in claim 2.

13. A rubber composition resulting from the vulcanization of a rubber mix comprising the product set forth in claim 3.

14. A rubber composition resulting from the vulcanization of a rubber mix comprising the product obtained when diphenyl-diamino-methane is treated with stearic acid.

In testimony whereof we affix our signatures.

ERNEST R. BRIDGWATER.
AARON S. SLACK.